United States Patent
Li et al.

(10) Patent No.: US 9,468,073 B2
(45) Date of Patent: Oct. 11, 2016

(54) ELECTRONIC DEVICE AND INFORMATION PROCESSING METHOD

(71) Applicants: Beijing Lenovo Software Ltd, Beijing (CN); Lenovo (Beijing) Limited, Beijing (CN)

(72) Inventors: Bin Li, Beijing (CN); Yiqiang Yan, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/813,228

(22) Filed: Jul. 30, 2015

(65) Prior Publication Data

US 2016/0270186 A1 Sep. 15, 2016

(30) Foreign Application Priority Data

Mar. 13, 2015 (CN) .......................... 2015 1 0112649

(51) Int. Cl.
*H05B 37/02* (2006.01)
(52) U.S. Cl.
CPC ...... *H05B 37/0227* (2013.01); *H05B 37/0218* (2013.01)
(58) Field of Classification Search
None
See application file for complete search history.

(56) References Cited

U.S. PATENT DOCUMENTS

| | | | | |
|---|---|---|---|---|
| 5,866,987 A | * | 2/1999 | Wut | A43B 1/0036 315/119 |
| 2008/0094827 A1 | * | 4/2008 | Huffman | F21S 6/003 362/197 |
| 2012/0139449 A1 | * | 6/2012 | Zilber | H05B 37/0227 315/307 |
| 2014/0043794 A1 | * | 2/2014 | Carriere | F21V 33/0008 362/103 |
| 2016/0091980 A1 | * | 3/2016 | Baranski | G06F 1/163 345/156 |

* cited by examiner

*Primary Examiner* — Dedei K Hammond
(74) *Attorney, Agent, or Firm* — Schwegman Lundberg & Woessner, P.A.

(57) ABSTRACT

The present disclosure provides an electronic device and an information processing method. The electronic device comprises: a light emitter configured to emit lights; a sensor configured to acquire a first specified parameter which is formed based on a motion state or gesture of an operator; a processor configured to determine whether the first specified parameter meets a first preset condition, so as to obtain a first determination result, and configured to control the light emitter to emit the lights based on the first determination result at least in a case that the first specified parameter meets the first preset condition. The first preset condition comprises that the operator is performing a predetermined motion or is in a predetermined gesture.

17 Claims, 3 Drawing Sheets

ELECTRONIC DEVICE AND INFORMATION PROCESSING METHOD

CROSS-REFERENCE TO RELATED APPLICATION(S)

This application claims priority to the Chinese Patent Application No. 201510112649.7, filed on Mar. 13, 2015, entitled "ELECTRONIC DEVICE AND INFORMATION PROCESSING METHOD", which is incorporated herein by reference in its entirety.

TECHNICAL FIELD

The present disclosure relates to an electronic device, and in particular, to an electronic device having a lighting emitter and an information processing method thereof.

BACKGROUND

As the development of electronic technology, electronic devices such as mobile phones, tablets or wearable devices are becoming more and more important in the human's life. There may be a light emitter capable of emitting lights provided in an electronic device. The light emitters can be used for illumination or indication. In the current electronic device, a control element (for example, a button) for controlling the light emitter is usually provided along with the light emitter. If a user wants to start the light emitter, he/she needs to touch the control element. In a case of no lights or no sufficient lights, it is more difficult for the user to accurately position the control element. The operation is inconvenient and the operation speed is not rapid enough.

SUMMARY

In view of the foregoing, embodiments of the present disclosure provide an electronic device and an information processing method that at least a partly alleviate the problem that it is difficult to control the electronic device to emit lights.

To achieve the above objects, embodiments of the present disclosure propose technical solutions as follows.

According to a first aspect of embodiments of the present disclosure, an electronic device is provided, comprising: a light emitter configured to emit lights; a sensor configured to acquire a first specified parameter which is formed based on a motion state or gesture of an operator; a processor configured to determine whether the first specified parameter meets a first preset condition, so as to obtain a first determination result, and configured to control the light emitter to emit the lights based on the first determination result at least in a case that the first specified parameter meets the first preset condition. The first preset condition comprises that the operator is performing a predetermined motion or is in a predetermined gesture.

According to a second aspect of embodiments of the present disclosure, an information processing method is provided, comprising acquiring a first specified parameter which is formed based on a motion state or gesture of an operator; determining whether the first specified parameter meets a first preset condition, so as to obtain a first determination result; controlling a light emitter to emit lights based on the first determination result at least in a case that the first specified parameter meets the first preset condition. The first preset condition comprises that the operator is performing a predetermined motion or is in a predetermined gesture.

BRIEF DESCRIPTION OF THE DRAWINGS

To illustrate embodiments of the present disclosure of technical solutions in the related art in a clearer manner, a brief introduction with regard to the figures described in the embodiments will be given below. Obviously, the figures in the following description are merely some embodiments of the present disclosure. For those ordinarily skilled in the art, other figures may be derived from these figures without any inventive effort.

DETAILED DESCRIPTION

The present disclosure is described in detail in conjunction with the drawings and exemplary embodiments.

First Device Embodiment

Figure 1:
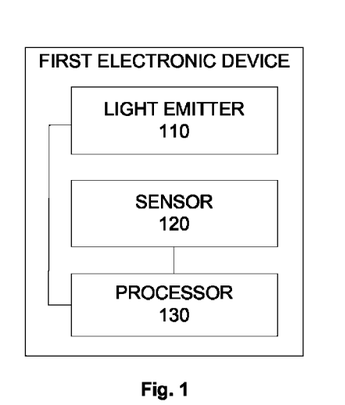
FIG. 1 is a first diagram showing a structure of an electronic device according to an embodiment of the present disclosure.

As shown in FIG. 1, the embodiment provides an electronic device comprising:
a light emitter 110 configured to emit lights,
a sensor 120 configured to acquire a first specified parameter which is formed based on a motion state or gesture of an operator, and
a processor 130 configured to determine whether the first specified parameter meets a first preset condition, so as to obtain a first determination result, and configured to control the light emitter to emit the lights based on the first determination result at least in a case that the first specified parameter meets the first preset condition.

The first preset condition comprises that the operator is performing a predetermined motion or is in a predetermined gesture.

The electronic device according to the embodiment may be a mobile phone, a tablet, a wearable device, and the like. The wearable device may comprise a smart watch, a smart bracelet, a smart necklace, a smart foot ring, a smart ring, and others.

Depending on its usage, the light emitter 110 may comprise a light emitter used for illumination, or a light emitter used for indication. The light emitter used for indication may include for example a laser used for indication.

Depending on an angle of divergence of the light beams emitted from the light emitter 110, the light emitter 110 may be a diverging light emitter or a non-diverging light emitter. The diverging light emitter generally emits divergent lights with an angle of divergence generally larger than a predetermined degree. The light emitter which emits light beams with an angle of divergence lower than the predetermined degree is generally a non-diverging light emitter as described above. A laser is usually a kind of non-diverging light emitter as described above.

The light emitter 110 usually may include a light emitting device. The light emitting device may be a light emitting diode, an incandescent lamp, a cold cathode diode, and others.

The sensor 120 may include various kinds of sensing devices that are capable of detecting the first specified parameter.

The processor 130 may include various kinds of processors that are capable of processing information. The processor may include one or more processors.

The processor 130 controls the light emitter to emit the lights based on information processing on the first specified parameter.

In an exemplary implementation, the light emitter 110 may further comprise a switch module and a power supply module. The switch module is connected to the power supply module. The switch module is configured to close when it receives a close signal from the processor, so that the power supply module is connected to the light emitting device to cause the light emitter to emit the lights. For example, the switch module may include a MOS transistor, a triode and the like that operates under the control of control signals outputted from the processor. The close signal may be one of the control signals.

The operator mentioned herein may be the user of the electronic device. The first preset condition may comprise that the operator is performing a predetermined motion or is in a predetermined gesture. The electronic device according to the embodiment of the present disclosure may emit the lights by itself according to the motion or gesture of the user. As such, the problem in the conventional solutions that it is difficult for the user to position a switch button of the electronic device in the dark which causes difficulty of the operation is greater and the user cannot find the light source timely may be better addressed. The intelligence of the electronic device and also the user's satisfaction are improved.

Second Device Embodiment

As shown in FIG. 1, the embodiment provides an electronic device comprising:

a light emitter 110 configured to emit lights, a sensor 120 configured to acquire a first specified parameter which is formed based on a motion state or gesture of an operator, and a processor 130 configured to determine whether the first specified parameter meets a first preset condition, so as to obtain a first determination result, and configured to control the light emitter to emit lights based on the first determination result at least in a case that the first specified parameter meets the first preset condition.

The first preset condition comprises that the operator is performing a predetermined motion or is in a predetermined gesture.

The electronic device may further comprise a main body part 140 and an attaching part 150 that are mechanically connected to each other.

The sensor 120 is arranged on the main body part 140 or the attaching part 150.

The processor 130 is located within the main body part 140 or the attaching part 150.

The attaching part 150 comprises at least an attaching status.

When the attaching part 150 is in the attaching status, the attaching part 150 may be at least a part of a circular space, or at least a part of an approximate circular space that meets a first preset condition.

The light emitter 110 is arranged on the main body part 140 or the attaching part 150, and can emit the lights to outside of the circular space or the approximate circular space.

The main body part 140 according to the embodiment may be an area such as an index dial of the smart watch, a display screen of a smart bracelet, and so on. The attaching part 150 may be for example a watch band of a smart watch, a bracelet of the smart bracelet, and other components that are worn on the operator.

The main body part 140 and the attaching part 150 are mechanically connected to be integral by for example various mechanical devices, or are directly integrated as a whole in molding.

The main body part 140 and the attaching part 150 provide installation carriers of the sensor 120, the processor 130 and the light emitter 110. Therefore, the sensor 120, the processor 130 and the light emitter 110 are arranged on the main body part 140 and/or the attaching part 150.

The attaching part 150 corresponds to an attaching state. When the attaching part 150 is in the attaching state, the whole electronic device forms a circular space or an approximate circular space. The approximate circular space may include an open circular space. The open circular space may be a circular space with an open smaller than a specified length, a circular space with a ratio of the open to the circular perimeter of the open circular space smaller than a first specified value, or a circular space with a ratio of the open to the internal diameter of the open circular space smaller than a second specified value.

The circular space and the approximate circular space may be located at periphery of a column that meets a second preset condition. The column may be for example a wrist, an ankle or a finger of the user. The circular space or the approximate circular space has an internal diameter slightly larger than the external diameter of the wrist, ankle or finger of the user, so that the user will wear it comfortably.

Usually, the attaching part 150 may further correspond to a non-attaching state. For example, the watch band of the smart watch may be untied so that the electronic device does not form the circular space or the approximate circular space.

In the embodiment, the light emitting nit 110 is arranged on the main body part 140 or the attaching part 150, and may emit the lights to outside of the circular space or approximate circular space, but not to the inside of the circular space or approximate circular space. This ensures that after the user wears the electronic device, the light emitter 110 will emit the lights outside.

The electronic device according to the embodiment is provided with the main body part and the attaching part, so that the user can wear it comfortably. The electronic device that is worn by the user generally moves as the body of the user moves, and thus can detect the first specified parameter simply, and can intelligently control to emit the lights based on detection of the motion or gesture of the operator (including the user).

Third Device Embodiment

As shown in FIG. 1, the embodiment provides an electronic device comprising:

a light emitter 110 configured to emit lights, a sensor 120 configured to acquire a first specified parameter which is formed based on a motion state or gesture of an operator, and a processor 130 configured to determine whether the first specified parameter meets a first preset condition, so as to obtain a first determination result, and configured to control the light emitter to emit the lights based on the first determination result at least in a case that the first specified parameter meets the first preset condition.

The first preset condition comprises that the operator is performing a predetermined motion or is in a predetermined gesture.

Figure 2:
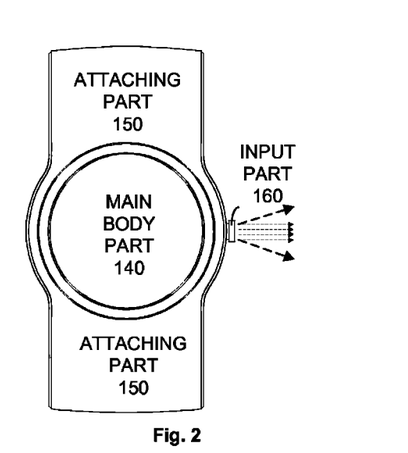
FIG. 2 is a second diagram showing a structure of an electronic device according to an embodiment of the present disclosure.

As shown in FIG. 2, the electronic device may further comprise a main body part 140 and an attaching part 150 that are mechanically connected to each other.

The sensor 120 is arranged on the main body part 140 or the attaching part 150.

The processor 130 is located within the main body part 140 or the attaching part 150.

The attaching part 150 comprises at least an attaching status.

When the attaching part 150 is in the attaching status, the attaching part 150 is at least a part of a circular space, or at least a part of an approximate circular space that meets a first preset condition.

The light emitter 110 is arranged on the main body part 140 or the attaching part 150, and may emit lights to outside of the circular space or the approximate circular space.

Figure 3:
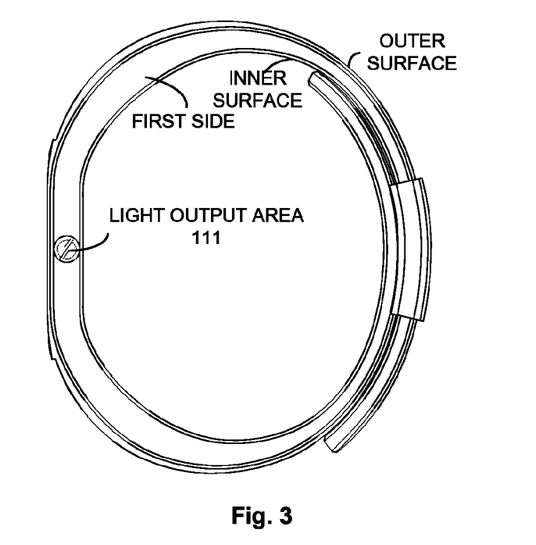
FIG. 3 is a third diagram showing a structure of an electronic device according to an embodiment of the present disclosure.

FIG. 3 shows a circular space formed by the main body part 140 and the attaching part 150.

As shown in FIG. 3, the electronic device is provided with a light output area 111 from which the lights output. The light output area 111 is located at a first side of the circular space or the approximate circular space, so that a specified degree is formed between the lights and the side of the circular space or the approximate circular space. The first side is a surface that connects an inner surface and an outer surface of the circular space or the approximate circular space.

The light output area 111 is an area for outputting the lights from the light emitter to outside of the electronic device. The light output area 111 may be a component of the light emitter 110 per se, or an area on the electronic device which is specifically arranged to be independent from the light emitter 110.

Generally, if the light emitter 110 is arranged on the surface of the electronic device, the light output area 111 is a component of the light emitter 110. The surface of the light output area 111 may be used as the surface of the light emitter 110, and also be used as an outer surface of the electronic device.

If the light emitter 110 is located within the electronic device, an area for light transmission and transmitting the lights to the outside of the electronic device is required to be provided in an area of the electronic device corresponding to the light emitter 110. The area is usually the light output area at the outer surface of the electronic device. In the case, the light output area is not included in the light emitter 110, and the surface of the light output area 111 does not constitute the surface of the light emitter 110.

The light output area 111 is arranged at a first side of the circular space or approximate circular space, so that the lights from the light emitter 110 can be emitted to the outside from the side of the circular space or approximate circular space.

The specified degree may refer to the degree formed between the side line of the light beams emitted from the light emitter 110 and a plane where the first side is located. The degree is usually larger than 0 degree, e.g., larger than 30 degrees or 45 degrees. In such a case, if the electronic device is a smart watch, it may ensure that the light emitter 110 emits the lights outside to the palm of the user.

In FIG. 2, the dotted arrow denotes lights emitted from the light emitter 110. As it can be seen from FIG. 2, a certain degree is formed between the lights emitted from the light emitter 110 and the circular space or approximate circular space. The specified degree may be for example 90 degrees or near 90 degrees.

The electronic device described in this embodiment further defines that the position where the light emitter 110 is arranged depends on a relative position relationship between the lights from the light emitter 110 and the circular space or approximate circular space, compared to the electronic device as described previously. In general, the electronic device according to this embodiment has a simple structure, and is more intelligent and other advantages.

In addition, if the light emitter 110 is a light emitter used for indication, the lights emitted from the light emitter are used for the indication. The lights may point at a specific direction. The specific direction is the same direction as the extension direction of the column configured by the electronic device. In an example, the electronic device is a smart watch or a smart bracelet, the light output area is arranged on the first side. When the electronic device is worn on the wrist of the user, the lights output from the light output area 111 travels along the extension direction from the wrist to the palm. That is, the pointing direction of the lights is the same as the extension direction from the wrist to the palm. The wrist is the column in the example.

Fourth Device Embodiment

As shown in FIG. 1, the embodiment provides an electronic device comprising:

a light emitter 110 configured to emit lights, a sensor 120 configured to acquire a first specified parameter which is formed based on a motion state or gesture of an operator, and a processor 130 configured to determine whether the first specified parameter meets a first preset condition, so as to obtain a first determination result, and configured to control the light emitter to emit the lights based on the first determination result at least in a case that the first specified parameter meets the first preset condition.

The first preset condition comprises that the operator is performing a predetermined motion or is in a predetermined gesture.

As shown in FIG. 2, the electronic device may further comprise a main body part 140 and an attaching part 150 that are mechanically connected to each other.

The sensor 120 is arranged on the main body part 140 or the attaching part 150.

The processor 130 is located within the main body part 140 or the attaching part 150.

The attaching part 150 comprises at least an attaching status.

When the attaching part 150 is in the attaching status, the attaching part 150 may be used as at least a part of a circular space, or at least a part of an approximate circular space that meets a first preset condition.

The light emitter 110 is arranged on the main body part 140 or the attaching part 150, and may emit the lights to outside of the circular space or the approximate circular space.

As shown in FIG. 2, the electronic device is provided with a light output area 111 from which the lights output.

The light output area 111 is located at a first side of the circular space or the approximate circular space, so that a specified degree is formed between the lights and the side of the circular space or the approximate circular space.

The first side is a surface that connects an inner surface and an outer surface of the circular space or the approximate circular space.

The light output area 111 is an area for outputting the lights from the light emitter to the outside of the electronic device. The light output area 111 may be a component of the light emitter 110 per se, or an area on the electronic device which is specifically arranged to be independent from the light emitter 110.

The main body part 140 comprises a first side part, a second side part, a third side part and a fourth side part that are connected from beginning to end.

The first side part and the third side part are arranged to be opposite, and the second side part and the fourth side part are arranged to be opposite.

The first side part and the third side part are mechanically connected to the attaching part 150, respectively.

The light output area 111 is arranged on the second side part or the fourth side part of the main body part.

Surfaces of the second side part and the fourth side part are a part of the first side.

This embodiment improves the previous embodiment. This embodiment defines the light output area 111 to be arranged on a side part of the main body part, and the side part on which the light output area 111 is arranged is not connected to the attaching part 150, so that it again ensures that lights from the light emitter 110 are transmitted to the outside of the electronic device and the outside of the circular space or approximate circular space.

Fifth Device Embodiment

As shown in FIG. 1, the embodiment provides an electronic device comprising:

a light emitter 110 configured to emit lights, a sensor 120 configured to acquire a first specified parameter which is formed based on a motion state or gesture of an operator, and a processor 130 configured to determine whether the first specified parameter meets a first preset condition, so as to obtain a first determination result, and configured to control the light emitter to emit the lights based on the first determination result at least in a case that the first specified parameter meets the first preset condition.

The first preset condition comprises that the operator is performing a predetermined motion or is in a predetermined gesture.

As shown in FIG. 2, the electronic device may further comprise a main body part 140 and an attaching part 150 that are mechanically connected to each other.

The sensor 120 is arranged on the main body part 140 or the attaching part 150.

The processor 130 is located within the main body part 140 or the attaching part 150.

The attaching part 150 comprises at least an attaching status.

When the attaching part 150 is in the attaching status, the attaching part 150 may be used as at least a part of a circular space, or at least a part of an approximate circular space that meets a first preset condition.

The light emitter 110 is arranged on the main body part 140 or the attaching part 150, and emits the lights to the outside of the circular space or the approximate circular space.

As shown in FIG. 2, the electronic device is provided with a light output area 111 from which the lights output.

The light output area 111 is located at a first side of the circular space or the approximate circular space, so that a specified degree is formed between the lights and the side of the circular space or the approximate circular space.

The first side is a surface that connects an inner surface and an outer surface of the circular space or the approximate circular space.

The electronic device may further comprise an input part 160.

The input part 160 comprises a knob module located on the second side part or the fourth side part of the main body part.

A light output area 111 from which lights from the light emitter 110 are outputted is provided at the center of a second side of the knob module. The second side is a surface of the knob module apart from the main body part.

The input part may be various components capable of inputting information on the electronic device. If the electronic device is a smart watch, the input part may be a knob for adjusting time or date on the smart watch.

The electronic device may have multiple operations modes, including for example a power-saving operation mode and a standard operation mode. In the power-saving operation mode, some applications are not available so as to save power. In the standard operation mode, all the applications may be operated, and thus the power consumption thereof may be great. The input part may be a switching knob for switching the operation modes.

In the embodiment, the light output area 111 of the light emitter 110 is arranged at the center of the second side of the knob module, so that the space of the knob module is sufficiently utilized and there is no need to arrange the light output area at a specific additional area on the second side part or the fourth side part of the main body part. By designing the electronic device in such a way, aesthetics of the electronic device is ensured while the electronic device has a fine structure, and thus the requirement of a user to an appearance of an electronic device can be satisfied.

If the lights emitted from the light emitter 110 can indicate a direction, in the electronic device according to the embodiment, the direction indicated by the lights emitted from the light emitter 110 matches with the orientation of the knob module.

Sixth Device Embodiment

As shown in FIG. 1, the embodiment provides an electronic device comprising:

a light emitter 110 configured to emit lights, a sensor 120 configured to acquire a first specified parameter which is formed based on a motion state or gesture of an operator, and a processor 130 configured to determine whether the first specified parameter meets a first preset condition, so as to obtain a first determination result, and configured to control the light emitter to emit the lights based on the first determination result at least in a case that the first specified parameter meets the first preset condition.

The first preset condition comprises that the operator is performing a predetermined motion or is in a predetermined gesture.

As shown in FIG. 2, the electronic device may further comprise a main body part 140 and an attaching part 150 that are mechanically connected to each other.

The sensor 120 is arranged on the main body part 140 or the attaching part 150.

The processor 130 is located within the main body part 140 or the attaching part 150.

The attaching part 150 comprises at least an attaching status.

When the attaching part 150 is in the attaching status, the attaching part 150 may be used as at least a part of a circular space, or at least a part of an approximate circular space that meets a first preset condition.

The light emitter 110 is arranged on the main body part 140 or the attaching part 150, and emits the lights to outside of the circular space or the approximate circular space.

The sensor 110 comprises a first sensing module located within the main body part or the attaching part.

The first sensing module is configured to acquire the first specified parameter by detecting motion parameters of the electronic device.

The first sensing module may comprise a sensor that can detect motion parameters of the electronic device itself, such as a gravity sensor or a gyroscope. If the electronic device is worn or held by the user, the electronic device may move as a part of the user (such as limbs) moves. Therefore, the electronic device may acquire the first specified parameter by the first sensing module detecting its own motion parameters. The first specified parameter may characterize the motion state or gesture of the operator (i.e., the user).

This embodiment is not only applicable to a wearable device comprising the attaching part 150, but also to a handheld electronic device such as a mobile phone or a tablet. The structure of detecting the first specified parameter has advantages such as a simple structure, a low hardware cost, and less changes to the structure and the layout of the existing electronic device.

Seventh Device Embodiment

As shown in FIG. 1, the embodiment provides an electronic device comprising:

a light emitter 110 configured to emit lights, a sensor 120 configured to acquire a first specified parameter which is formed based on a motion state or gesture of an operator, and a processor 130 configured to determine whether the first specified parameter meets a first preset condition, so as to obtain a first determination result, and configured to control the light emitter to emit the lights based on the first determination result at least in a case that the first specified parameter meets the first preset condition. The first preset condition comprises that the operator is performing a predetermined motion or is in a predetermined gesture.

As shown in FIG. 2, the electronic device may further comprise a main body part 140 and an attaching part 150 that are mechanically connected to each other.

The sensor 120 is arranged on the main body part 140 or the attaching part 150.

The processor 130 is located within the main body part 140 or the attaching part 150.

The attaching part 150 comprises at least an attaching status.

When the attaching part 150 is in the attaching status, the attaching part 150 may be used as at least a part of a circular space, or at least a part of an approximate circular space that meets a first preset condition.

The light emitter 110 is arranged on the main body part 140 or the attaching part 150, and may emit the lights to outside of the circular space or the approximate circular space.

The first specified parameter comprises motion parameters of muscles of the operator.

The sensor 110 comprises a second sensing module located at the inner surface of the circular space or the approximate circular space. The second sensing module is configured to detect motion parameters of the muscles.

If the electronic device is a smart watch, a smart foot ring, a smart bracelet or a smart ring, the second sending module may be a sensor that is located at the inner surface of the circular space or the approximate circular space and may detect motion signals of muscles of the user.

When the second sensing module is operating, the motion parameters of muscles are acquired by contacting skin of the user.

For example, the second sensing module may comprise a Bio muscle electronic sensor (for example a Medical Grade Stainless Steel EMG sensor).

The Bio muscle electronic sensor may comprise electrodes that contact the skin of the operator, collects signals via the electrodes to complete collection of the signals and generates a surface electromyogram. The surface electromyogram comprises a one-dimensional time sequence of signals indicating the bioelectric change of the neuromuscular system that are directed and recorded from the surface of the muscles when the muscles act, and thus may reveal the activity mode of the motion unit and the state of muscle function to some extent. The electronic device may identify the gesture of the operator, such as the gesture of the hand, according to the surface electromyogram. The gesture may comprise a stationary gesture and a moving gesture.

This embodiment provides an electronic device that directly detects the motion parameters of the muscles corresponding to the gesture of the operator, so that the electronic device can intelligently enable the light emitter based on the first specified parameter characterizing the motion state or gesture of the operator. The electronic device is more intelligent, and the user's satisfaction is high.

Eighth Device Embodiment

As shown in FIG. 1, the embodiment provides an electronic device comprising:

a light emitter 110 configured to emit lights, a sensor 120 configured to acquire a first specified parameter which is formed based on a motion state or gesture of an operator, and a processor 130 configured to determine whether the first specified parameter meets a first preset condition, so as to obtain a first determination result, and configured to control the light emitter to emit the lights based on the first determination result at least in a case that the first specified parameter meets the first preset condition.

The first preset condition comprises that the operator is performing a predetermined motion or is in a predetermined gesture.

As shown in FIG. 2, the electronic device may further comprise a main body part 140 and an attaching part 150 that are mechanically connected to each other.

The sensor 120 is arranged on the main body part 140 or the attaching part 150.

The processor 130 is located within the main body part 140 or the attaching part 150.

The attaching part 150 comprises at least an attaching status.

When the attaching part 150 is in the attaching status, the attaching part 150 may be used as at least a part of a circular space, or at least a part of an approximate circular space that meets a first preset condition.

The light emitter 110 is arranged on the main body part 140 or the attaching part 150, and may emit lights to outside of the circular space or the approximate circular space.

The sensor 120 comprises an image collector located at a side of the circular space or the approximate circular space.

The sensor 120 is configured to acquire the first specified parameter by collecting an image of motion state or gesture of the operator via the image collector.

The image collector may be various kinds of sensors that can collect an image, including for example a camera or a video camera. The image collector according to the embodiment is an image collector that can collect an image even in the case that the ambient luminance is lower than a preset luminance (for example, at night). The image collector may be an infrared image collector that may directly collect an infrared image in a situation that the ambient luminance is low, so as to acquire an image of the motion state or gesture, not like a common image collector which needs to enable a flashlight in the situation that the ambient luminance is low.

In the implementation, the electronic device may further extract gesture characteristics and/or motion trajectory characteristics of a specified part of the body of the operator in the image. The gesture characteristics and/or motion trajectory characteristics may be a part of the first specified parameter. For example, the image collector collects an image of the motion state of gesture of the hand of the operator. In that case, the gesture characteristics may be the gesture or motion trajectory characteristics of the hand in the collected image.

The electronic device according to this embodiment comprises an image collector that collects the motion state or gesture of the operator, so that the electronic device can intelligently enable the light emitter. The electronic device is more intelligent, and the user satisfaction is high.

Ninth Device Embodiment

As shown in FIG. 1, the embodiment provides an electronic device comprising:

a light emitter 110 configured to emit lights, a sensor 120 configured to acquire a first specified parameter which is formed based on a motion state or gesture of an operator, and a processor 130 configured to determine whether the first specified parameter meets a first preset condition and obtain a first determination result, and configured to control the light emitter to emit the lights based on the first determination result at least in the case that the first specified parameter meets the first preset condition.

The first preset condition comprises that the operator is performing a predetermined motion or is in a predetermined gesture.

The electronic device further comprises a luminance detector configured to detect an ambient luminance.

The processor is further configured to determine whether the ambient luminance is lower than a first preset luminance.

The processor is configured to control the light emitter 110 to emit the lights based on the first determination result, when the first specified parameter meets the first preset condition and the ambient luminance is lower than the first preset luminance.

The luminance detector may comprise a sensor that is capable of detecting luminance, such as a photosensitive resistance. The luminance detector can detect the ambient luminance of the environment the electronic device is located. If the current ambient luminance is high enough, and the light emitter 110 is a light emitter used for illumination, the operation may be an incorrect operation of the user. In order to prevent the light emitter 110 from emitting the lights in response to the incorrect operation, the electronic device according to this embodiment may further comprise a luminance detector configured to detect and determine whether the ambient luminance is lower than a first preset luminance. Thereby, the incorrect operation can be avoided, and thus the intelligence of the electronic device may be improved again. The problem that the user is not satisfied with the condition that the electronic device emits the lights in the day or under the light due to his incorrect operation may be addressed.

The luminance detector may be located at any surface of the electronic device which can detect the ambient luminance. In order to detect the ambient luminance better, this embodiment will further define that the luminance detector has a light collecting direction that matches with the light output direction of the light emitter 110, in order to avoid the problem that after the electronic device is worn by the user, the light collecting area of the luminance detector is covered by objects, such as clothes of the user, resulting in an inaccurate detection result. "Match" comprises that the light collecting direction of the luminance detector is the same as the light output direction of the light emitter 110, and also the azimuthal angle corresponding to the light collecting direction of the luminance detector is slightly larger than the azimuthal angle formed in the light output direction.

In order to have the light collecting direction match with the light output direction of the light emitter 10, usually the luminance detector is arranged at the same side of the electronic device as the light emitter 110. For example, assuming that the electronic device is an electronic device comprising the attaching part 150 as illustrated in the second device embodiment, both the luminance detector and the light emitter 110 are arranged at the first side. In this way, when the user wears the smart watch or the smart bracelet, the problem that his/her clothes cover the luminance detector and thus an inaccurate result is obtained will not occur. Therefore, the accuracy of intelligently controlling, by the electronic device, the light emitter 110 to emit the lights is further improved.

Tenth Device Embodiment

As shown in FIG. 1, the embodiment provides an electronic device comprising:

a light emitter 110 configured to emit lights, a sensor 120 configured to acquire a first specified parameter which is formed based on a motion state or gesture of an operator, and a processor 130 configured to determine whether the first specified parameter meets a first preset condition, so as to obtain a first determination result, and configured to control the light emitter to emit the lights based on the first determination result at least in the case that the first specified parameter meets the first preset condition.

The first preset condition comprises that the operator is performing a predetermined motion or is in a predetermined gesture.

The electronic device further comprises an adjuster connected to the light emitter 110.

The processor 130 is further configured to determine a first direction the operator is pointing at, and control the adjuster to adjust the light output direction of the light emitter 110 so that the light emitter emits the lights to the first direction.

The electronic device according to this embodiment further comprises an adjuster. The processor 130 controls the adjuster to adjust the light output direction of the light emitter 110. When the operator executes a gesture operation or is in a gesture, the gesture not only controls the light emitter 110 to emit the lights, but also controls the light output direction of the light emitter 110. The light output direction mentioned herein is the first direction.

There are various methods for determining the first direction, including at least the following methods.

In the first method, the first specified parameter characterizes the motion direction of the operator and/or the electronic device, and the processor 130 determines the first direction based on the motion direction. For example, a smart watch is worn on the left hand of the operator. When the user lifts up his/her arm to move forward, the electronic device moves forward along the user's arm. The direction from the initial position of the electronic device before movement to the end position of the electronic device after the movement can be taken as the first direction. The first direction is the direction from the initial position to the end position. The "first direction" used herein may refer to a set of multiple directions. For example, a central direction directed to the end position may be formed between the initial position and the end position. The direction that shifts the central direction by a predetermined degree to the left and to the right in the horizontal plane can also be regarded as the first direction.

In the second method, the first direction may be the direction the operator in a predetermining gesture is pointing at. For example, the predetermined gesture may comprise a hand gesture. The hand gesture may be a gesture where one or more fingers extend. The direction where the one or more fingers extend is the first direction. For example, in a gesture where the forefinger extends while the other fingers close, the extending direction of the forefinger is the first direction. In another example, the hand gesture is a gesture where the midfinger and the forefinger extend and the other fingers close, the extending direction of the midfinger and the forefinger is the first direction. When the hand gesture is a gesture where more than one finger extends, the extending direction of two fingers that are farthest away is the boundary of the first direction. In that case, the first direction is a set of directions comprising a plurality of directions.

In order to detect that the finger is extending or closing in the hand gesture, a sensor including an image collector may be used. A sensor that can detect a muscle electrical signal may also be used to detect the applied force by determining such as muscle stretching, rotating, bending and others.

The adjuster is connected to the light emitter 110 via a transmission mechanism. The adjuster may drive all or part of the light emitter 110 to change its position, and thereby adjust the light output direction of the light emitter. In an example, the light output direction of the light emitter 110 may be changed by adjusting the orientation of a light emitting device in the light emitter 110.

In another example, the adjuster is fixedly connected to the light emitter 110. Movement of the adjuster can change the light output direction of the light emitting device in the light emitter 110 by shifting itself, so as to adjust the light output direction of the lights.

The adjuster may comprise a rotating motor that has a rotation function. The rotating motor may change the orientation of the light emitting device by rotating the light emitting device connected thereto, so as to change the light output direction of the lights.

There are several structures and methods for the adjuster changing the light output direction of the light emitter 110, and they are not limited to the foregoing examples.

Moreover, the processor 130 may further be configured to determine whether the first direction is apart from the operator. The light emitter 110 is controlled to emit the lights only if the first direction is apart from the operator. Otherwise, in some scenarios, even if the first specified parameter meets the first preset condition, the operation that controls the light emitter 110 to emit the lights may be prevented. In this way, the incorrect operation may be reduced, and the accuracy that electronic device intelligently controls the light emitter 110 to emit lights is further improved, thereby the user satisfaction is improved.

First Process Embodiment

Figure 4:
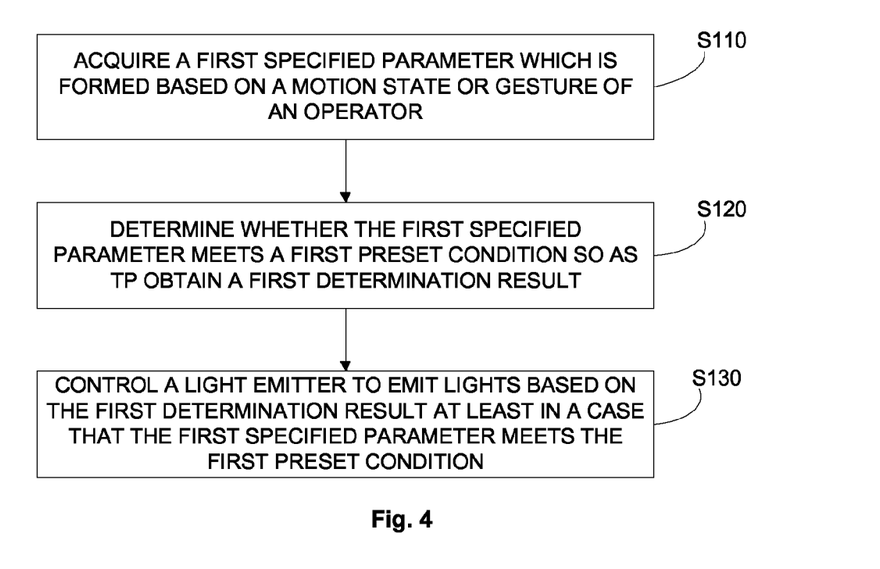
FIG. 4 is a first flow chart showing an information processing method according to an embodiment of the present disclosure.

As shown in FIG. 4, the embodiment provides an information processing method, comprising:

step S110 of acquiring a first specified parameter which is formed based on a motion state or gesture of an operator;

step S120 of determining whether the first specified parameter meets a first preset condition, so as to obtain a first determination result;

step S130 of controlling a light emitter to emit lights based on the first determination result at least in a case that the first specified parameter meets the first preset condition.

The first preset condition comprises that the operator is performing a predetermined motion or is in a predetermined gesture.

The information processing method according to this embodiment can be applicable to the electronic device as described in any of the first device embodiment to the tenth device embodiment, including a mobile phone, a tablet or an e-book that is held by the operator (including the user), or a wearable device such as a smart watch or a smart bracelet.

The first specified parameter acquired in step S110 may be various parameters that characterize the motion state or gesture of the operator.

In step S120, it is determined whether the first specified parameter meets a first preset condition based on the first specified parameter. If the first specified parameter is a motion parameter or gesture parameter of the operator, it is determined whether the operator is performing a predetermined motion or is in a predetermined gesture directly based on the first specified parameter.

In step S130, the light emitter is intelligently controlled based on the first determination result of step S120. In this way, the user may control the electronic device to emit the lights by his/her body motion in the dark or dim environment without positioning the button for controlling the light emitter in the dark. It is easy to operate the electronic device, and the electronic device is more intelligent. The user's satisfaction is improved accordingly.

The light emitter according to the embodiment has a structure same as the light emitter illustrated in the device embodiments, and will not described for simplicity.

Second Process Embodiment

As shown in FIG. 4, the embodiment provides an information processing method, comprising:

step S110 of acquiring a first specified parameter which is formed based on a motion state or gesture of an operator;

step S120 of determining whether the first specified parameter meets a first preset condition so as to obtain a first determination result;

step S130 of controlling a light emitter to emit lights based on the first determination result at least in the case that the first specified parameter meets the first preset condition.

The first preset condition comprises that the operator is performing a predetermined motion or is in a predetermined gesture.

Step S110 may comprise acquiring the first specified parameter by detecting motion parameters of the electronic device.

If the electronic device is worn or held by the user, the electronic device moves as the body of the user moves. In the embodiment, the first specified parameter can be acquired by detecting motion of the electronic device via a gravity sensor or a gyroscope located within the electronic device to reveal motion state or gesture of the operator.

In the embodiment, the first specified parameter is the motion parameter of the electronic device, including for example motion trajectory, motion magnitude or motion type. The motion trajectory includes a path passing from position A to position B. The motion magnitude includes an amount that characterizes the motion magnitude, for example the length from position A to position B. the motion type includes a linear motion, an arc motion, a back and forward motion, or a motion moving to a next point. All the motion parameters can be used to characterize the motion state of the operator or a gesture after the operator has executed a motion.

The information processing method according to embodiment further defines how to acquire the first specified parameter, compared with the information processing method according to the foregoing embodiment. It is easier to operate the method of acquiring the first specified parameter according to the embodiment.

Third Process Embodiment

As shown in FIG. 4, the embodiment provides an information processing method, comprising:

step S110 of acquiring a first specified parameter which is formed based on a motion state or gesture of an operator;

step S120 of determining whether the first specified parameter meets a first preset condition, so as to obtain a first determination result;

step S130 of controlling a light emitter to emit lights based on the first determination result at least in the case that the first specified parameter meets the first preset condition.

The first preset condition comprises that the operator is performing a predetermined motion or is in a predetermined gesture.

The first specified parameter comprises motion parameters of muscles of the operator.

Step S110 may comprise detecting motion parameters of a specified piece of muscle of the operator.

In Step S110, the motion parameters of muscles of the operator are detected by a sensor that is arranged on a surface of the electronic device to contact skin of the operator. As such, it is easy to detect motion state and gesture of the operator. Obviously, this embodiment provides a method of acquiring the first specified parameter different from the method according to the second process embodiment. It is also easy to operate the method.

Third Process Embodiment

As shown in FIG. 4, the embodiment provides an information processing method, comprising:

step S110 of acquiring a first specified parameter which is formed based on a motion state or gesture of an operator;

step S120 of determining whether the first specified parameter meets a first preset condition and obtaining a first determination result;

step S130 of controlling a light emitter to emit lights based on the first determination result at least in the case that the first specified parameter meets the first preset condition.

The first preset condition comprises that the operator is performing a predetermined motion or is in a predetermined gesture.

Step S110 may comprise acquiring the first specified parameter by collecting an image of motion state or gesture of the operator.

In the embodiment, the electronic device may collect an image of motion state or gesture of the operator by various kinds of image collectors, for example a camera or a video camera, and acquire the first specified parameter based on the image. The first specified parameter may be parameters characterizing motion state or gesture of the operator, including motion trajectory, gesture parameter or motion magnitude, or motion type extracted from the image.

In the implementation, in order to collect an image of the motion state or gesture of the operator in a dark or dim environment, a non-visible light collector, such as an infrared collector including an infrared camera that radiates itself, may be used to collect the image.

Similarly, this embodiment provides a method of acquiring the first specified parameter based on the first process embodiment. It is easy to operate the method.

Fourth Process Embodiment

As shown in FIG. 4, the embodiment provides an information processing method, comprising:

step S110 of acquiring a first specified parameter which is formed based on a motion state or gesture of an operator;

step S120 of determining whether the first specified parameter meets a first preset condition and obtaining a first determination result;

step S130 of controlling a light emitter to emit lights based on the first determination result at least in the case that the first specified parameter meets the first preset condition.

The first preset condition comprises that the operator is performing a predetermined motion or is in a predetermined gesture.

Figure 5:
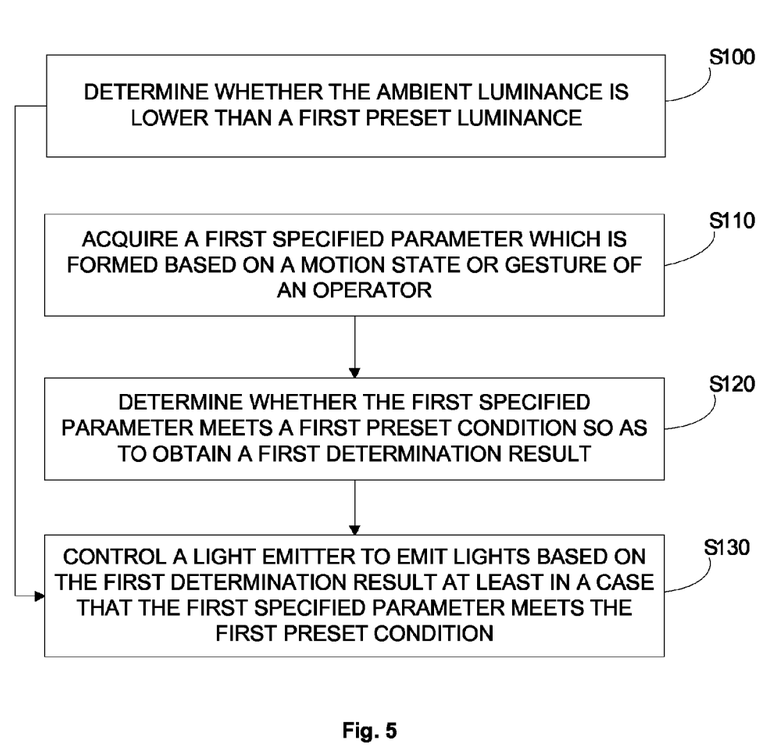
FIG. 5 is a second flow chart showing an information processing method according to an embodiment of the present disclosure.

As shown in FIG. 5, the method may further comprise:

step S100 of detecting an ambient luminance and determining whether the ambient luminance is lower than a first preset luminance.

The step S130 may comprise controlling the light emitter to emit lights based on the first determination result when the first specified parameter meets the first preset condition and the ambient luminance is lower than the first preset luminance.

The electronic device detects the ambient luminance by a luminance detector that has a light collecting direction matching with the light output direction of the light emitter; and controls the light emitter to emit the lights only if the ambient luminance is lower than the first preset condition. The incorrect operation can be prevented, and thus the intelligence of the electronic device is improved again. The light emitter is prevented from emitting the lights in response to an incorrect operation of the user. The electronic device is more intelligent, and the user's satisfaction is improved.

Fifth Process Embodiment

As shown in FIG. 4, the embodiment provides an information processing method, comprising:

step S110 of acquiring a first specified parameter which is formed based on a motion state or gesture of an operator;

step S120 of determining whether the first specified parameter meets a first preset condition and obtaining a first determination result;

step S130 of controlling a light emitter to emit lights based on the first determination result at least in the case that the first specified parameter meets the first preset condition.

The first preset condition comprises that the operator is performing a predetermined motion or is in a predetermined gesture.

The method may further comprise:

determining a first direction the operator is pointing at based on the first specified parameter; and adjusting the light output direction of the light emitter so that the light emitter emits the lights to the first direction.

In the implementation, the motion state or gesture of the operator that triggers the electronic device to emit the lights may be a motion or gesture of the operator that has a directivity. In the case, the electronic device may extract, from the first specified parameter, a first direction the operator is pointing at. In an example, an image of a gesture of a hand of the user is collected via the third process embodiment, and the first direction is determined based on the direction one or more fingers of the user' hand point at. The electronic device may also control the light emitter to emit lights to the first direction.

In this way, when the user moves his/her body, the electronic device is triggered to emit lights, and also it is controlled to emit the lights to a certain direction. The controlling on the electronic device is simplified. The electronic device is more intelligent, and the user satisfaction is improved.

In the implementation, the electronic device may provide various kinds of adjusters that may change its position, to adjust the light output direction of the light emitter. There are various adjusting methods, and they are not described herein for simplicity.

According to the electronic device and information processing method of the embodiments of the present disclosure, the electronic device intelligently detects the first specified parameter that indicates the motion state or gesture of the operator, and performs an automatic control on the light emitting unit in the electronic device to emit the lights based on the determination whether the first specified parameter meets the first preset condition. With the structure of the electronic device, it emits the lights intelligently according to the motion or gesture of the operator. In the case that it is so dark that it is inconvenient for the operator to operate a button, the operator can control the electronic device to emit the lights conveniently. The problem that it is difficult to control the electronic device to emit the lights is addressed, and the intelligence of the electronic device and also the usage satisfaction of the user are improved.

In the embodiments of the present disclosure, it can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processor, or each of these units can be a separate unit, or two or more units can be integrated into one unit. Such integrated unit can be implemented in hardware, possibly in combination with software functional units.

It may be understood by the skilled in the art that all or parts of steps for implementing the above method embodiments may be implemented by hardware associated with program instructions. The above program may be stored in a computer readable storage medium, which when executed, may perform steps of the above method embodiments. The above storage medium may comprise various media which may store program codes, such as a movable storage device, a read-only memory, a random access memory, a magnetic disc or an optical disc.

As illustrated above, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. An electronic device, comprising:
a light emitter configured to emit lights;
a sensor configured to acquire a first specified parameter which is formed based on a motion state or gesture of an operator;
a luminance detector configured to detect an ambient luminance, wherein the luminance detector has a light collecting direction that matches with a light output direction of the light emitter; and
a processor configured to determine whether the first specified parameter meets a first preset condition, so as to obtain a first determination result, and configured to control the light emitter to emit the lights based on the first determination result at least in a case that the first specified parameter meets the first preset condition, wherein the first preset condition comprises that the operator is performing a predetermined motion or is in a predetermined gesture.

2. The electronic device according to claim 1, further comprising:
a main body part; and
an attaching part that is mechanically connected to the main body part, wherein the sensor is arranged on the main body part or the attaching part, and the processor is located within the main body part or the attaching part, wherein the attaching part comprises at least an attaching status, wherein when the attaching part is in the attaching status, the attaching part is at least a part of a circular space, or at least a part of an approximate circular space that meets the first preset condition, and wherein the light emitter is arranged on the main body part or the attaching part, and emits the lights to outside of the circular space or the approximate circular space.

3. The electronic device according to claim 2, wherein the electronic device is provided with a light output area from which the lights output, and wherein the light output area is located at a first side of the circular space or the approximate circular space, so that a specified degree is formed between the lights and the side of the circular space or the approximate circular space, the first side being a surface that connects an inner surface and an outer surface of the circular space or the approximate circular space.

4. The electronic device according to claim 3, wherein the main body part comprises a first side part, a second side part, a third side part and a fourth side part that are connected from beginning to end, the first side part and the third side part being arranged to be opposite, and the second side part and the fourth side part being arranged to be opposite, wherein the first side part and the third side part are mechanically connected to the attaching part, respectively, wherein the light output area is arranged on the second side part or the fourth side part of the main body part, and wherein surfaces of the second side part and the fourth side part are a part of the first side.

5. The electronic device according to claim 3, further comprising an input part, wherein the input part comprises a knob module located on the second side part or the fourth side part of the main body part, and wherein the light output area from which the lights from the light emitter are outputted is provided at a center of a second side of the knob module, the second side being a surface of the knob module apart from the main body part.

6. The electronic device according to claim 2, wherein the sensor comprises a first sensing module located within the main body part or the attaching part, and wherein the first sensing module is configured to acquire the first specified parameter by detecting motion parameters of the electronic device.

7. The electronic device according to claim 2, wherein the first specified parameter comprises motion parameters of muscles of the operator, and wherein the sensor comprises a second sensing module, which is located at the inner surface of the circular space or the approximate circular space and configured to detect the motion parameters of the muscles.

8. The electronic device according to claim 2, wherein the sensor comprises an image collector located at a side of the circular space or the approximate circular space, and wherein the sensor is configured to acquire the first specified parameter by collecting an image of the motion state or gesture of the operator via the image collector.

9. The electronic device according to claim 8, wherein the image collector is configured to collect an image of motion state or gesture of a hand of the operator.

10. The electronic device according to claim 1, wherein the processor is further configured to determine whether the ambient luminance is lower than a first preset luminance, and wherein the processor is configured to control the light emitter to emit the lights based on the first determination result, when the first specified parameter meets the first preset condition and the ambient luminance is lower than the first preset luminance.

11. The electronic device according to claim 1, further comprising an adjuster connected to the light emitter, wherein the processor is further configured to determine a first direction the operator is pointing at, and control the adjuster to adjust the light output direction of the light emitter so that the light emitter emits the lights to the first direction.

12. An information processing method, comprising:
detecting an ambient luminance by a luminance detector having a light collecting direction that matches with a light output direction of a light emitter;
acquiring a first specified parameter which is formed based on a motion state or gesture of an operator;
determining whether the first specified parameter meets a first preset condition, so as to obtain a first determination result; and
controlling a light emitter to emit lights based on the first determination result at least in a case that the first specified parameter meets the first preset condition, wherein the first preset condition comprises that the operator is performing a predetermined motion or is in a predetermined gesture.

13. The information processing method according to claim 12, wherein acquiring the first specified parameter comprises:
acquiring the first specified parameter by detecting motion parameters of the electronic device.

14. The information processing method according to claim 12, wherein the first specified parameter comprises motion parameters of muscles of the operator, and wherein acquiring the first specified parameter comprises detecting motion parameters of a specified piece of muscle of the operator.

15. The information processing method according to claim 12, wherein acquiring the first specified parameter comprises:
acquiring the first specified parameter by collecting an image of the motion state or gesture of the operator.

16. The information processing method according to claim 12, further comprising:
determining whether the ambient luminance is lower than a first preset luminance, and wherein controlling the light emitter to emit the lights based on the first determination result at least in the case that the first specified parameter meets the first preset condition comprises:
controlling the light emitter to emit the lights based on the first determination result when the first specified parameter meets the first preset condition and the ambient luminance is lower than the first preset luminance.

17. The information processing method according to claim 12, further comprising determining a first direction the operator is pointing at based on the first specified parameter; and adjusting the light output direction of the light emitter so that the light emitter emits the lights to the first direction.

* * * * *